UNITED STATES PATENT OFFICE.

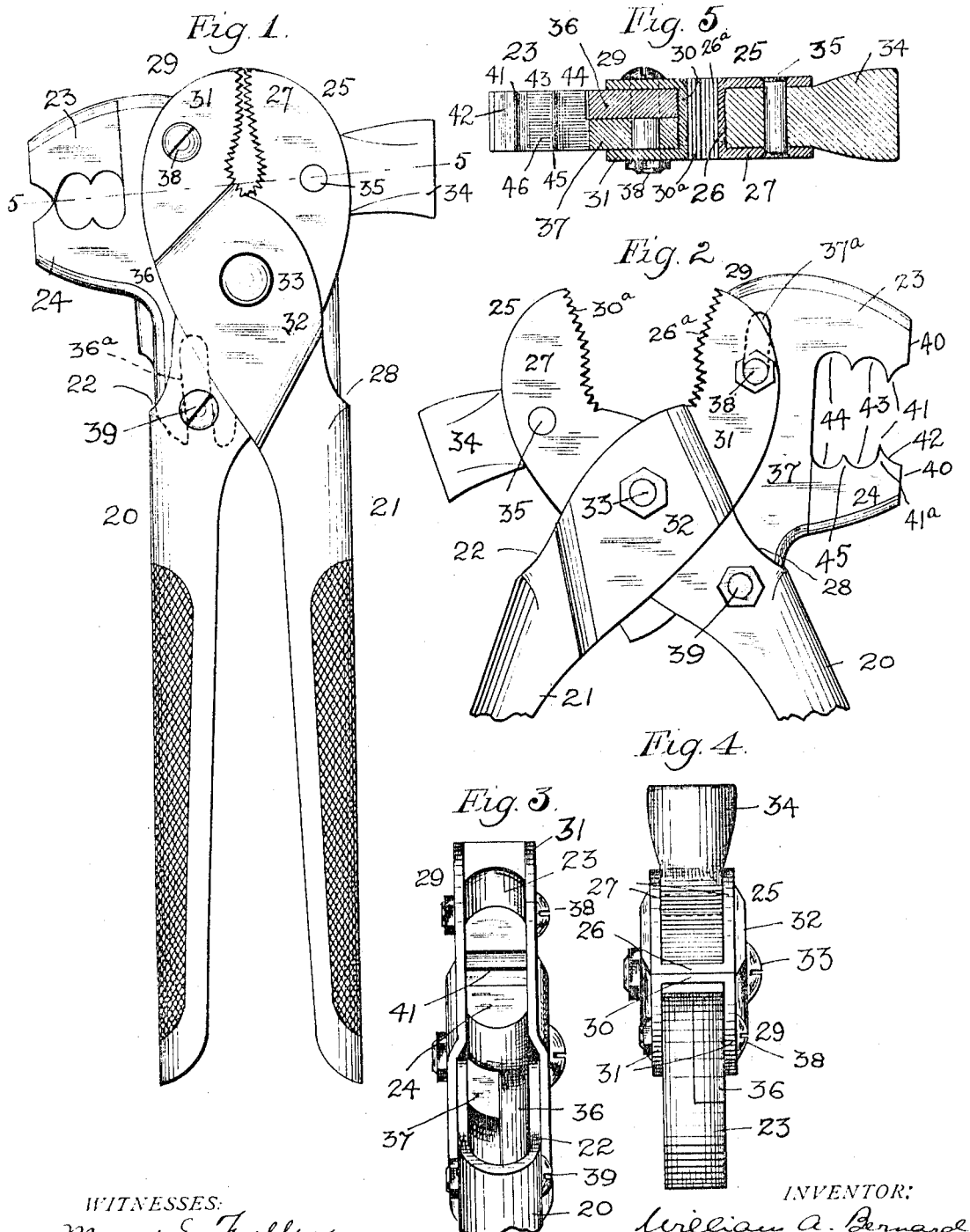

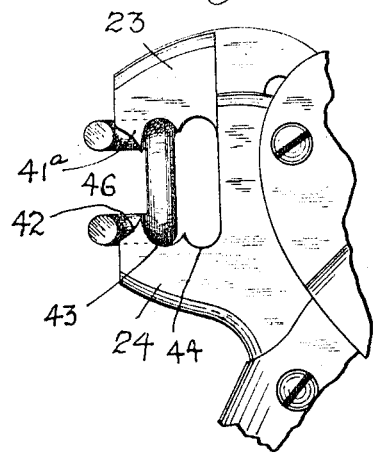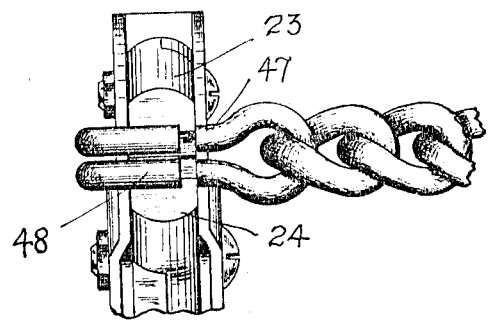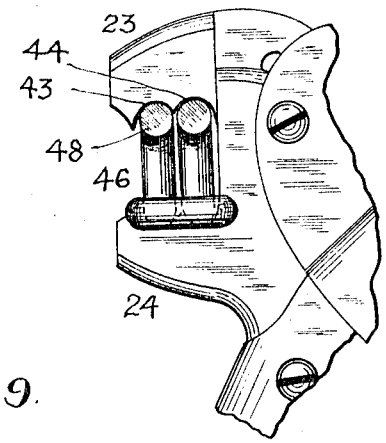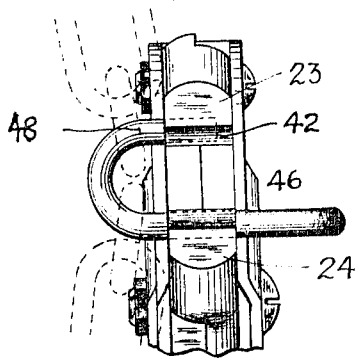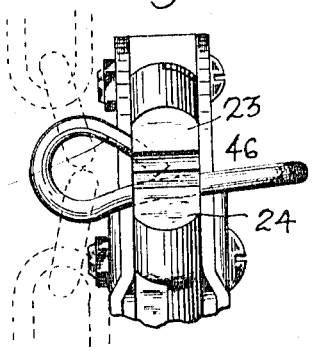

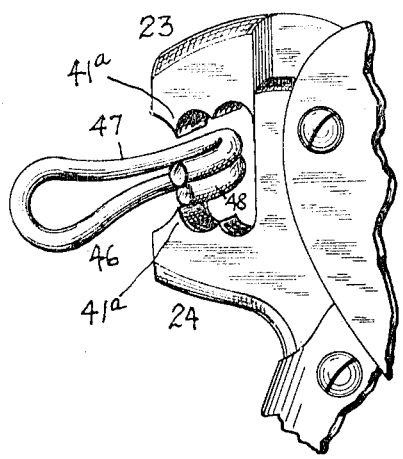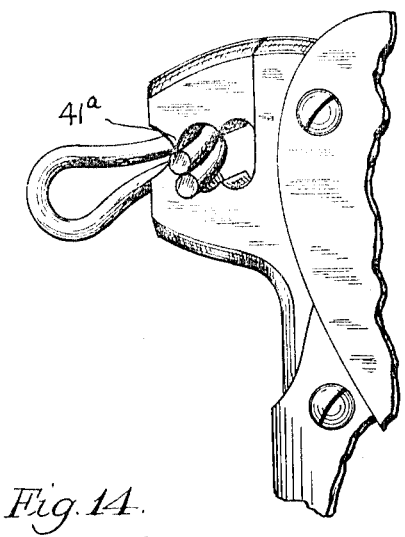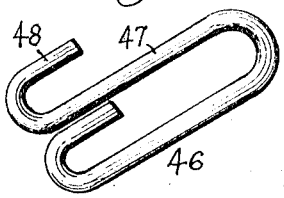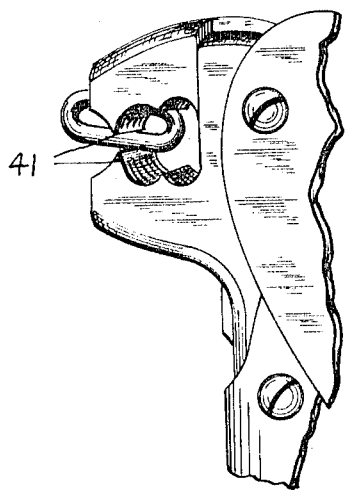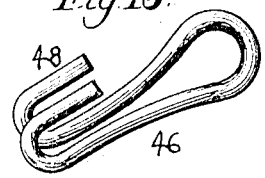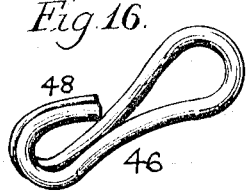

WILLIAM A. BERNARD, OF NEW HAVEN, CONNECTICUT, ASSIGNOR TO THE WILLIAM SCHOLLHORN COMPANY, OF NEW HAVEN, CONNECTICUT, A CORPORATION OF CONNECTICUT.

PLIERS OR SIMILAR TOOL.

1,102,384.  Specification of Letters Patent.  Patented July 7, 1914.

Application filed March 20, 1913. Serial No. 755,656.

*To all whom it may concern:*

Be it known that I, WILLIAM A. BERNARD, a citizen of the United States, residing in New Haven, county of New Haven, and State of Connecticut, have invented certain new and useful Improvements in Pliers or Similar Tools, of which the following is a full, clear, and exact description.

This invention relates to an improved tool of the plier, or lever handle, type, which is primarily intended for use in connection with the well-known tire chains commonly employed on automobiles to prevent them from skidding.

My invention provides a tool which is especially well adapted for use in connecting the cross chains, or tread chains, with the side chains, and disconnecting them therefrom.

The improved tool is adapted to operate in a simple and effective manner on the well-known double hooks by which the tread chains are connected with the side chains, either for securing said hooks to the side chains, or disconnecting them therefrom. As a result, the tool is admirably adapted for use by automobilists, for it provides a very handy and convenient means for making repairs on the road, or elsewhere, when one or more of the tread chains are worn through, or become useless from some other cause.

My improved tool is also provided with a novel form of end cutter which may be used for severing the links of the side chains, and for various other purposes.

Another advantage of my invention resides in the fact that the improvements are applicable to a simple form of compound tool for the use of automobilists, in which a number of valuable features are combined.

To these and other ends, the invention consists in the novel features and combinations of parts to be hereinafter described and claimed.

In the accompanying drawings, Figure 1 is a side elevation of a tool embodying the invention, having a main pair of plier or wrench jaws, and a subsidiary pair of jaws for operating on tire chains, both pairs of jaws being closed; Fig. 2 is a fragmentary view of the tool looking from the opposite side, with both pairs of jaws open; Fig. 3 is a fragmentary side or edge view of Fig. 1 looking toward the subsidiary jaws; Fig. 4 is an end view of Fig. 1, looking toward the main jaws; Fig. 5 is a section on line 5—5 of Fig. 1; Figs. 6–12 inclusive show various operations in attaching a tread chain to a side chain, and disconnecting it therefrom; Fig. 13 illustrates the employment of the subsidiary jaws as an end cutter; and Figs. 14–16 are perspective views of one of the double hooks for connecting a tread chain with a side chain, as hereinafter described.

Referring to the drawings, 20 and 21 indicate the lever handles of the tool, which handles are preferably constructed of sheet metal bent to present a U-shaped or channeled cross-section. The forward end of the member 20 is cut away at 22 to accommodate the shanks of subsidiary jaws 23 and 24, but the forward extremity of said member 20 is formed to present a main jaw 25 of U-shaped cross-section consisting of an inner serrated wall 26 and parallel side walls 27. The forward end of the member 21 is constructed similarly, it being cut away at 28 and having at its forward extremity a jaw 29, consisting of a serrated inner wall 30, and parallel side walls 31. The open part of the member 21 at the rear of the jaw 29 is bent outward at 32 so as to straddle the open portion of the member 20, and the members are pivoted together by means of a pivot pin 33 passing through the open forked portions of both members.

It will be understood from the foregoing description that both of the jaws 25 and 29 are of U-shaped cross-section. This is shown particularly in Fig. 5. The inner walls 26 and 30 of the respective jaws lie parallel to each other and the respective pairs of side walls 27 and 31 extend outward from the inner walls in opposite directions. The inner walls 26 and 30 are preferably provided with transverse serrations 26ª, 30ª, and the walls 26 and 30 are preferably curved in the manner shown in Figs. 1 and 2, so as to provide surfaces which may be used for gripping in a very effective manner round or polygonal bodies of various sizes as the jaws 25 and 29 are opened to a greater or less extent.

The subsidiary jaws 23 and 24 hereinbefore mentioned are mounted to operate in the space between the side walls 31 of the jaw 29, and in the space between the side walls 27 of the jaw 25. I place an instrumentality, such as a hammer head, 34. This hammer head is rigidly secured to the jaw 25 by means of a rivet 35 passing through the side walls 27, and through a hole in the shank of the hammer head. The connection is made rigid and strong by upsetting the ends of the rivet 35, as shown in Fig. 5.

Referring now to the detailed construction of the subsidiary jaws 34 and 24, it will be noted that the jaw 24 comprises a shank 36, lying substantially at right angles to the main part of the jaw and extending lengthwise of the main jaw 29 between the side walls 31. The shank 36 is about half as wide as the space between the inner surfaces of the walls 31. The jaw 23 has a generally similar shank 37 fitted between the walls 31 alongside the shank 36, as shown in Fig. 5. The shank 36 of jaw 24 is fixedly pivoted to the forward extremity of the jaw 29, in advance of the main pivot 33, by means of a pivot pin 38 extending through a circular hole in the shank 36 and corresponding circular holes in the side walls 31. At the opposite end of the shank 36, i. e., at the rear of the main pivot 33, said shank has a sliding connection with the member 21. This connection is effected by means of a pin 39 connecting the side plates of the member 21 and engaged by a slot 36ª extending lengthwise of the shank 36. The shank 37 of the jaw 23, on the other hand, is slidable on the pin 38 by means of a slot 37ª and fixedly pivoted on the pin 39. By this mounting, the jaws 23 and 24 will be separated from each other as the handle members 20 and 21 are separated, whereas said jaws 23 and 24 will be approached toward each other as the handle members 20 and 21 are brought together, substantially as described in my application Serial No. 732,550, filed November 20, 1912.

In order to carry out the functions hereinafter described, the working portions of the jaws 23 and 24 are formed as follows:
Each jaw is provided at some distance inward from its outer end 40 with a cutting edge 41 directed transversely thereof across the full width of the jaw. At one side of the edge 41, the jaw is concaved, as shown at 42, and at the opposite side of the edge 41, seats 43 and 44 are provided extending parallel with each other across the full width of the jaw, and in parallelism with the cutting edge 41. The edge 41 is at the apex of a wedge-shaped projection 41ª, one side of which is defined by the concave surface 42, while the opposite side is constituted by a portion of the concave surface of the seat 43. The transverse seats 43 and 44 are of approximately semi-circular cross-section and are separated from each other by a ridge 45. Moreover, these seats are provided with serrations or ribs, extending transversely thereof, i. e., longitudinally of the jaw, so that chain links, and the like, may be firmly gripped between the opposing jaws. When the cutting edges 41 of the respective jaws are in contact, as shown in Fig. 1, the bottoms of the seats 43 and 44 of one jaw will preferably be spaced from the corresponding seats of the other jaw to about the extent indicated in Fig. 1. The coöperating concavities 42 and 43 of each of the jaws 23, 24 create in conjunction a marginal wedge-shaped member 41 between them, which member extends transversely of the jaw and is adapted to act as a cutter, or as a separating device, as hereinafter set forth. Similarly, the coöperating concavities 43 and 44 of each jaw also create between them a marginal wedge-shaped member 45 adapted to act as a spacing element, as hereinafter set forth.

Supposing that a tread chain of the well-known form is to be connected to a side chain, the procedure is as follows: A U-shaped double hook 46 of commercial form (Fig. 14) is run through one of the end links of the tread chain. The legs or branches 47 of the double hook member are then squeezed together in the manner shown in Figs. 7 and 15, so as to connect the member 46 securely to the tread chain, and bring together the hooks 48 of the member 46, so that said hooks may be readily attached to the side chain. In bending together the legs or branches 47, the hook member is placed between the jaws 23 and 24 in the manner shown in Fig. 6. In the case illustrated, the legs or branches 47 are disposed lengthwise of the opposite seats 43, so that when the jaws 23 and 24 are brought together, the member 46 will be bent in the form shown in Fig. 7. The next step, viz., connecting the hook member 47 with the side chain, is carried out in the manner shown in Figs. 8, 9 and 10. The hook portions 48, which are then in close contiguity with each other, are passed through one or more links of the side chain, and the member 46 is then placed between the jaws 23 and 24 in the manner shown in Figs. 8 and 9. One of the hooks 48 rests in one of the seats 43, and the other member 48 rests in the adjacent seat 44. Similarly, one of the legs 47 of the hook member lies in the other seat 43, and the other leg of the hook member lies in the other seat 44. The jaws 23 and 24 are then approached toward each other, so as to bend down both hooks 48 in the form shown in Figs. 10 and 16, under which conditions, the hook will be securely fastened to the side chain. Supposing that one of the tread chains is broken, said chain may be easily disconnected from the side chain for making repairs, by using the improved tool in the manner shown in Figs. 11 and 12. The wedges 41ª of the opposing jaws 23 and 24 are brought together between the ends of the hooks 48 and the main body of the hook member 46. The jaws 23 and 24 are then approached toward each other, as shown in Fig. 12, and the ends of the hook member will be forced outward to release the side chain. The concave portion 42 of each jaw, which forms one side of the separating wedge, permits the wedge to be easily inserted between the corresponding tip or extremity of the hook member and the body portion thereof, owing to the fact that said concave portion conforms to a certain extent to the cross-sectional curvature of the body portion. On the other hand, the curvature of the seat 43, which defines the other side of the wedge, conforms approximately to the cross-sectional curvature of the tip or extremity 48. By this construction, the separating wedges may be introduced into the hook portion of the member 46 to a considerable extent before the jaws are subjected to pressure.

Fig. 13 shows the manner in which the coöperating edges 41 of the jaws 23 and 24 may be used for cutting. These edges 41 constitute an end cutter which is useful for cutting chain links, and for various other purposes.

The compound tool shown in the drawings has been found of special advantage to automobilists. The jaws 23 and 24 have the numerous functions hereinbefore noted in connection with the adjustment and repair of tire chains, and the main jaws 25 and 29 may be used to remove nuts, and to perform various other offices, acting either as a wrench or a vise. The hammer 34, associated with the jaw 25, increases still further the utility and scope of the tool. Of course, I have not attempted to illustrate and describe the various modifications of the construction which may be adopted within the scope of my invention, as expressed in the claims.

What I claim is:—

1. Pliers or a similar tool having each of its jaws provided with a transverse wedge-shaped member at the end of the jaw, one side face of said wedge-shaped member being constituted by a concave portion on the outside of the jaw extending to the forward extremity of the latter, and the other side of said wedge-shaped member being constituted by a portion of the wall of a transverse seat in the jaw; substantially as described.

2. Pliers or a similar tool having each of its jaws provided with a transverse wedge-shaped member at the end of the jaw, one side face of said wedge-shaped member being constituted by a concave portion on the outside of the jaw extending to the forward extremity of the latter, and the other side of said wedge-shaped member being constituted by a portion of the wall of a transverse seat in the jaw, said wedge-shaped members of the respective jaws being adapted to meet each other as the jaws are brought together; substantially as described.

3. Pliers or a similar tool having each of its jaws provided with a transverse wedge-shaped member at the end of the jaw, one side face of said wedge-shaped member being constituted by a concave portion on the outside of the jaw extending to the forward extremity of the latter, and the other side of said wedge-shaped member being constituted by a portion of the wall of a transverse seat in the jaw, the wedge-shaped members of the respective jaws being provided with cutting edges movable into contact with each other as the jaws are brought together; substantially as described.

4. Pliers or a similar tool having each of its jaws provided with a plurality of seats, said seats extending transversely of the respective jaws, edged wedge-members on the respective jaws adjacent said seats and adapted to meet each other as the jaws are brought together, and means for moving the jaws toward and away from each other, while maintaining them in substantial parallelism; substantially as described.

5. Pliers or a similar tool having each of its jaws provided with a transverse wedge-shaped member at the end thereof, one side face of said wedge-shaped member being constituted by a concave portion on the outside of the jaw, said jaw also having a plurality of inner transverse seats, the wall of one of said seats being partially constituted by the other side face of said wedge-shaped member, the wedge-shaped members of the respective jaws being arranged to meet each other as the jaws are brought together, and means for moving the jaws toward and away from each other, while maintaining them in substantial parallelism substantially as described.

In witness whereof, I have hereunto set my hand on the 19th day of March, 1913.

WILLIAM A. BERNARD.

Witnesses:
HENRY E. ROCKWELL,
M. OLIVE WILLIAMS.